May 5, 1970 H. G. E. AHLBIN 3,509,602
INJECTION MOULDING DEVICE WITH A PLURALITY OF CAVITY PLATES
Filed Sept. 6, 1968 2 Sheets-Sheet 1

HANS GUSTAV ERIK AHLBIN
INVENTOR

BY *Stevens, Davis, Miller & Mosher*
ATTORNEYS

May 5, 1970          H. G. E. AHLBIN          3,509,602
INJECTION MOULDING DEVICE WITH A PLURALITY OF CAVITY PLATES
Filed Sept. 6, 1968          2 Sheets-Sheet 2
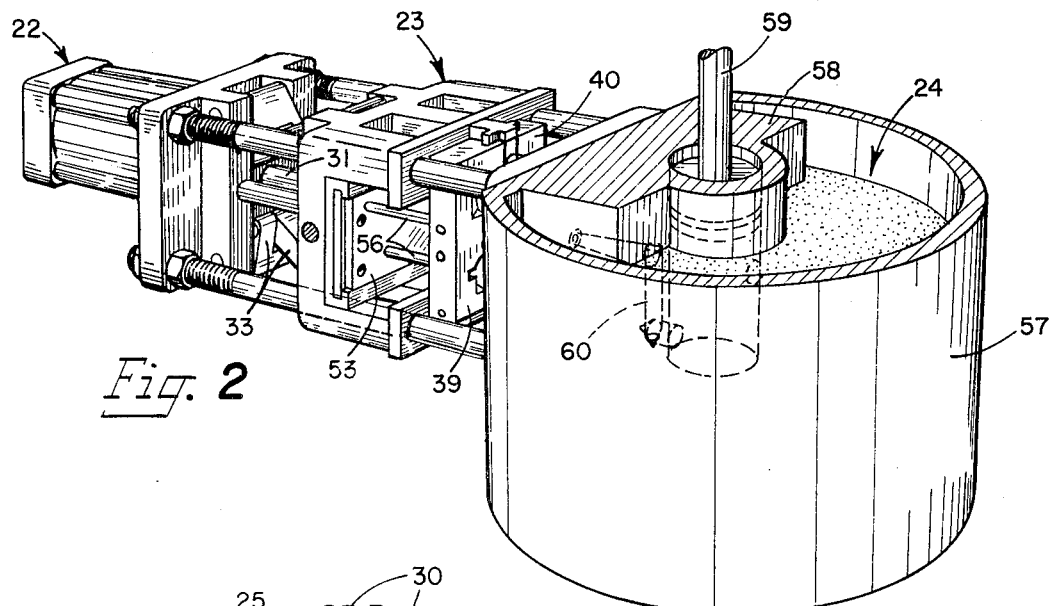
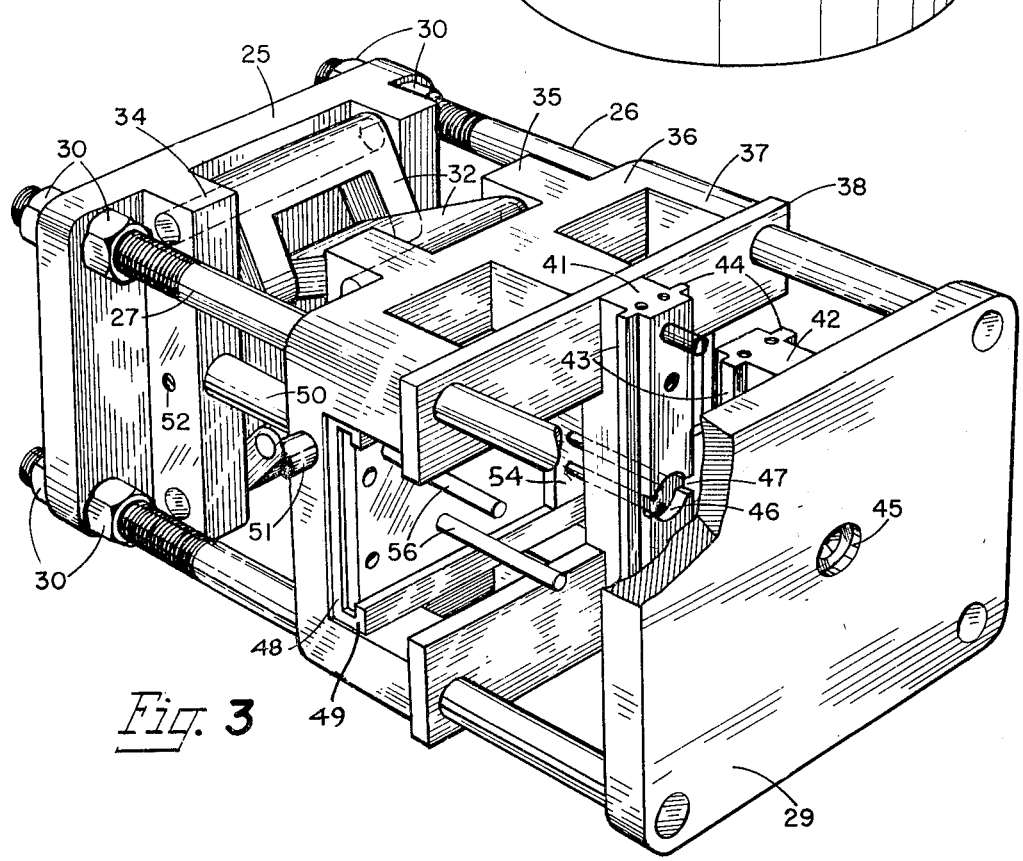
INVENTOR
HANS GUSTAV ERIK AHLBIN
BY
Stevens, Davis, Miller & Mosher
ATTORNEYS United States Patent Office 3,509,602
Patented May 5, 1970

3,509,602
INJECTION MOULDING DEVICE WITH A PLURALITY OF CAVITY PLATES
Hans Gustav Erik Ahlbin, Sturegatan 14, Sundbyberg, Sweden
Continuation-in-part of application Ser. No. 539,212, Mar. 31, 1966. This application Sept. 6, 1968, Ser. No. 758,055
Claims priority, application Sweden, Apr. 2, 1965, 4,275/65
Int. Cl. B29c 1/16; B22d 17/22
U.S. Cl. 18—42                                            4 Claims

ABSTRACT OF THE DISCLOSURE

An arrangement in casting and moulding apparatus by which a plurality of separate cavity plates can be grouped about a common polygonal supporting block which has a gate communicating with casting material distribution passages in the cavity plates. One corner of each cavity plate is cut away at such an angle to the side edges thereof that the length of the cut surface corresponds exactly with the length of the support surfaces in the block so that, when pressed into abutment with their respective support surfaces, the side edges of the cavity plates firmly abut the side edges of neighbouring cavity plates in interlocking relationship.

---

The present application is a continuation-in-part of my application Ser. No. 539,212 filed Mar. 31, 1966, now abandoned.

An arrangement for mounting a number of separate cavity plates in die casting, injection moulding and similar machines for the casting and moulding of materials such as metal, plastics, thermosetting plastics and the like.

The present invention is concerned with an arrangement by which a number of cavity plates or moulds can be mounted in die casting machines, injection moulding machines and the like, which present a first stationary setting-up platen and a second setting-up platen capable of being moved towards and away from the stationary platen. The two platens are adapted to support moulds in positions in which they communicate with distribution passages for the casting material which passes through a gate in the stationary platen and which conducts the casting material to the distribution passages. The two platens and the moulds present mutually cooperating guides or fixtures adapted to position and align the moulds in the machine.

It has long been the practice in the fields of die casting and injection moulding to mount only one mould in the machine; the mould itself bearing the gate and distribution passages for the casting material, as well as the mould cavities. During the development of moulding and casting techniques the size and capacity of the machines have progressively increased, enabling several different articles to be moulded in the same moulding operation. If the different articles being moulded form part of the same mechanical structure and are thus required in the same numbers and for the same purpose the machine can be run until the series is completed. On the other hand, however, if the different articles being moulded belong, for instance, to different customers and are required in different numbers it is necessary upon completing one series either to block off certain cavities in the mould or to change the entire mould and then continue casting the remaining articles until the requisite number has been moulded.

In order to circumvent this disadvantage so-called parent moulds were introduced to the art, these moulds being in principle frame-like structures which enable a plurality of separate cavity plates to be grouped about a common, stationary gate in the parent mould. The parent moulds are provided with stationary holders of fixed dimensions which enable cavity plates dimensioned to fit these particular holders to be placed in position and connected to the distribution passages passing from the common gate in the frame. The parent moulds, however, are also restricted in their use since they can only be used for mould sizes which correspond to the dimensions of the holders in the parent mould. A further restriction of the parent moulds is that the operator can only cast articles whose size corresponds to the mould dimensions for which the parent mould is constructed.

Furthermore, it is not possible in practice to change one or more cavity plate in the parent mould while retaining the remaining cavity plates in their working position. Thus, when it is desirable to change the cavity plates, for instance upon completing a particular series, it is necessary to remove the entire parent mould from the machine, together with all cavity plates, and subsequent to effecting the change, re-set the parent mould with new cavity plates and remount the assembly in the machine. This necessary sequence of events is difficult, time consuming and causes long periods of interruption in production.

Consequently, there is still a need in moulding or casting machines of this type for an arrangement by which it is possible to remove selectively and individually one or more moulds from their setting-up position while the remaining moulds are retained in their working positon in the machine thereby enabling a single mould to be replaced by a completely different mould. Furthermore, it is also desirable to selectively mount moulds which vary greatly in size.

The object of the present invention is to make it possible to group a number of moulds—in practice restricted to four—about a stationary gate, which is common to all moulds, in such a manner that the moulds are guided firstly against stationary support surfaces and secondly by intimate abutment with the edge surfaces of adjacent moulds.

In accordance herewith the invention is mainly characterized in that on each platen there is mounted a polygonal block, each of the two blocks having the same dimensions and, when brought together, define therebetween distribution passages for the casting material, and at each side edge thereof form support surfaces for respective mould halves. The mould halves are cut away at an edge surface, which presents an opening for receiving the casting material from the distribution passages defined by the blocks, at such an angle to the side of the edge surface that the length of the cut face of the mould half is the same as the length of the support surface on the block. When the cut surfaces of the mould halves are brought to bear against the support surfaces on the block, the mould halves intimately abut each other along contiguous edge surfaces of neighbouring mould halves.

The invention will now be described in more detail with reference to an embodiment thereof shown diagrammatically in the accompanying drawings, further characteristic features of the invention being disclosed in conjunction therewith.

FIGURE 2 is a perspective view of a compression moulding machine assembled to a melting pot for metal, according to the so-called hot chamber system.

FIGURE 3 shows, in perspective, the same machine as in FIGURE 2 but in larger scale and with the melting pot removed.

FIGURE 1 shows, in perspective, one of the two opposing, cooperating support blocks designed according to the invention and surrounded by a group of separate mould halves or cavity plates, which abut respective support surfaces on the blocks and the edge surfaces of adjacent mould halves.

Figure 1:
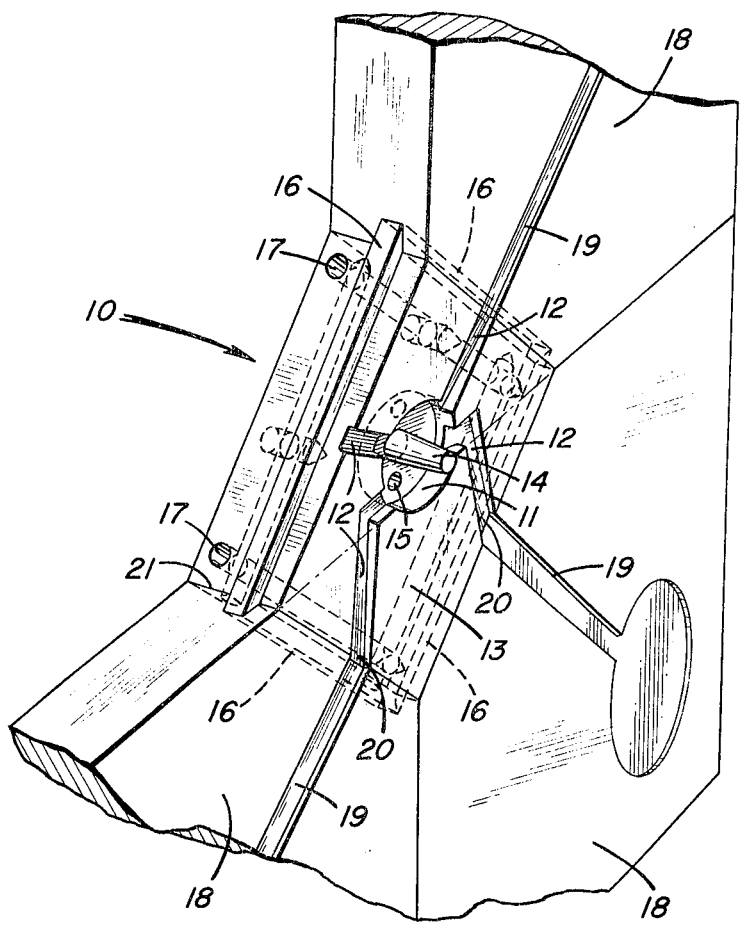
FIGURE 1 is a perspective view illustrating a device for simultaneously setting up four separate mould halves in a compression moulding machine.

In FIGURE 1 there is shown a square support block 10, which is secured to the movable platen in a casting or moulding machine. It is of course understood that this block cooperates with a complementary block (not shown) of the same dimensions and fixed to the stationary platen in the same machine. In the shown embodiment the block is positioned, so that the diagonals are directed vertically and horziontally as is the complementary block.

The block 10 on the movable platen is provided with a gate 11 and distributing passages 12, which open into substantially the center of the edge surfaces of the block. The complementary block (not shown) on the stationary platen may present an essentially unbroken front surface, which together with the front surface 13 of the block 10 defines the distribution passages 12 when the blocks are brought together. The complementary block is, of course, provided with a passage communicating with the gate 11. The gate 11 includes, in a known manner, a conical core 14 and is provided at the bottom with holes 15 for ejector pins. Extending along the edge surfaces of the block are guide ribs or ridges designated with the reference numeral 16, and which are intended to engage in a known manner with longitudinally extending grooves of complementary shape disposed in the mould halves. The block also has cooling ducts 17, which are connected at the rear sides of thet blocks to a coolant circulation system (not shown).

Grouped about both the block 10 and it complementary block are four mould halves 18, one of which has been removed in the figure to more clearly show the structure of the block 10. The mould halves shown in the drawing are essentially square or rectangular in shape, and may thus differ considerably in size.

Arranged in one edge surface of each mould half is an opening 19 which, when the mould halves are in working position, register with an opening 20 of the respective distribution passages 12. The corners of the mould halves shown in the drawing are cut away at an angle of 45° to the edge surface so that the length of the resulting cut surface coincides with the length of the support surfaces on the block 10. It should also be noted that a longitudinally extending groove of complementary shape to the rib 16 is arranged in the cut surface 21. By means of this arrangement the mould halves abut the block 10 with the openings for receiving casting material in register with the distribution passages in the block, and all mould halves grouped around said block lay in interlocking relationship in abutment with adjacent edge surfaces of the mould halves, whereby the mould halves cooperate mutually to stabilize each other in their working position. The mould halves are usually attached and secured by special, well known attachment means, but the arrangement according to the invention enables any mould whatsoever to be removed from its operating position while leaving remaining moulds undisturbed. Consequently, the moulds can be changed at will without causing long interruptions in production. Furthermore, when using the inventive arrangement moulds can be interchanged or changed for moulds of completely different sizes. The drawing illustrates an arrangement of four moulds grouped about a square block. However, there is nothing to prevent blocks which present more than four support surfaces from being used, e.g. a hexagon.

Shown in FIGURE 2 are the parts of a compression moulding machine intended for such metals as zinc, magnesium, lead and in certain cases aluminum, which machine was described in the above-mentioned parent application. These parts include a double action plunger arrangement 22 for operating the machine, the mechanical moulding tool device 23 and a melting pot arrangement 24 for metal, illustrated in the form of an embodiment constructed according to the known, so-called hot chamber system. It will naturally be understood that it lies within the scope of the invention to use alternatively the so-called cold chamber system.

A back plate 25 which, via guide means 26, 27 and 28 is connected to a front moulding table 29. The guide means are threaded and provided with double nuts 30 to enable the distance between the back plate 25 and the front, stationary moulding table 29 to be adjusted.

A plunger device 22 is securely mounted to the rear face of the back plate 25, whereby the plunger rod 31 can slide through said back plate, in a manner known per se, to actuate a double toggle lever device, consisting of link groups 32 and 33, usually via a block (not shown). The links are pivotally mounted on one side between two vertical brackets 34 located on the front face of the back plate, and on the other side between two additional brackets 35 projecting backwards from the mobile moulding table 36 of the machine. This moulding table 36 is slidably mounted on the guide means in the longitudinal direction of the same, and is intended, via the two toggle lever devices, to be displaced by means of the plunger rod 31 towards and away from the front, stationary moulding table 29.

Contrary to normal conditions in similar machines, the mobile moulding table 36 is provided with a stationary setting-up frame which substantially consists of projections 37 and sole plates 18 mounted thereon, said sole plates 38 being intended to build a setting-up plane for the one group of mould halves 39 and 40 which are adapted to cooperate with complementary mould halves (not shown) on the stationary moulding table 29.

Included in the frame arrangement in which the mould halves are set up are, firstly a vertical bracket 41 projecting away from the mobile table, and secondly a corresponding bracket 42 projecting away from the stationary table 29. These brackets gain distinction by virtue of the fact that they present guide means in the form of flanges or ribs 43 and 44, intended to fit into corresponding guide channels in preferably standardized mould-half blanks, in a manner which will be described later on. Further, the gate 45 (see FIGURE 3) is intended to open out in front of the brackets 42, at a certain distance from the plane of the moulding table.

A distribution recess 46 is arranged in the bracket 41 opposite the mouth of the gate and is provided with suitable distributing channels 47 in such a way that the metal can flow through the gate and be distributed to various moulding tools via the distributing channels 47.

A predominantly U-shaped base plate 48, provided with retaining flanges 49, is displaceably mounted between the projections 37 on the mobile table 36, parallel to itself in the path of movement of said table. Movement of the base plate 48 can be effected by a number of commonly known methods, e.g. one or more rods 50 designed with a rack (not shown) in combination with a gear or the like which is rotated by means of a spindle 51 and which engages the rack of cogs on the rod. The rod 50, naturally, slides freely through a corresponding guide located in the mobile table 36. Moreover, it is assumed that an adjustable stop (not shown) may be arranged in the bracket 34, which stop can be fixed by means of the set screw 52. Naturally, the arrangement just described can be doubled, i.e. it can also be positioned on the other side of the back plate 25 and the mobile table, to balance the movement of the base plate 48 in the mobile table.

A conventional ejector plate 53 is mounted for free movement in the base plate 48 in the longitudinal direction of the same, said ejector plate 53 being intended for a moulding tool, i.e. two complementary halves on one side of the tool. A similar ejector plate (not shown) for another mould is intended to be entered on the opposite side of the tool. A retainer plate 54 supporting the rods which eject the sprue is inserted between the two ejector plates. The width of the retainer plate 54 is at most the same as the width of the bracket 41.

As can be seen from FIGURE 2, an ejector plate 53 provided with ejector rods 56 for the mould 39 is secured to the base plate 48 by means of screws. The ejector rods 56 project through the mould 39 in the usual manner.

The melting pot arrangement comprises a tank 57 e.g. filled to a certain level with molten metal. Arranged in this tank is a pump housing 58 in which is arranged a plunger 59. A channel 60 communicates with the gate 45 (see FIGURE 3) and is led away from the lower portion of the pump housing 58. When the plunger 59 is raised, the pump housing is filled with metal and when at the moment of casting the plunger is depressed, the molten metal is forced via the channel 60, the gate 45, the distribution recess 46 and the distribution channels 47, into the moulds 39 and 40, which are assumed to be closed in that the mobile table 36 has been moved toward the stationary table 29.

I claim:

1. An arrangement by which a number of cavity plates, moulds and the like can be mounted in die casting machines, injection moulding machines and the like, which present a first stationary setting-up platen and a second setting-up platen capable of being moved towards and away from the stationary platen, moulds mounted on the two platens in communication with distribution passages for casting material, a gate extending through the stationary platen to pass the casting material to the distribution passages, and mutually cooperating guides means formed on said platens and said moulds adapted to position and align the moulds in the machines, wherein the improvement comprises a polygonal block mounted on each platen, each of the two blocks having the same dimensions and, when brought together defining therebetween distribution passages for the casting material, and at each side edge thereof forming support surfaces for respective mould halves, said moulds having a cut away edge surface with an opening therein for receiving the casting material from the distribution passages defined by the blocks, said cut edge surface being at such an angle to the side of the mould that the length of the cut edge surface is the same as the length of the support surface of the block and when the cut surfaces of the moulds are brought to bear against the support surfaces on the block the moulds intimately abut each other along contiguous edge surfaces of adjacent moulds.

2. An arrangement according to claim 1, in which the blocks and the moulds are rectangular in shape, and that the moulds are cut away at a corner at an angle of 45° to form said cut edge surface.

3. An arrangement according to claim 2, in which the support surfaces of the blocks and the cut edge surfaces of the moulds have mutually engaging guide means of complementary shape formed thereon.

4. An arrangement according to claim 3, in which the blocks are square in shape and are arranged with their diagonals extending vertically and horizontally.

References Cited

UNITED STATES PATENTS

| 2,956,321 | 10/1960 | Halward. | |
| 3,315,318 | 4/1967 | Halward | 18—42 X |
| 3,174,189 | 3/1965 | Cutler et al. | 18—2 X |

FOREIGN PATENTS

| 374,196 | 2/1969 | Switzerland. |

ROBERT D. BALDWIN, Primary Examiner

U.S. Cl. X.R.

164—303, 316